US012734586B2

(12) United States Patent
Silva et al.

(10) Patent No.: US 12,734,586 B2
(45) Date of Patent: Sep. 15, 2026

(54) AUTOMATIC INDEXING FOR CUTTING INSERT

(71) Applicant: KENNAMETAL INC., Latrobe, PA (US)

(72) Inventors: Marcelo Euripedes Silva, Piracicaba (BR); Pavel Pecher, Unicov (CZ)

(73) Assignee: KENNAMETAL INC., Latrobe, PA (US)

( * ) Notice: Subject to any disclaimer, the term of this patent is extended or adjusted under 35 U.S.C. 154(b) by 659 days.

(21) Appl. No.: 18/182,352

(22) Filed: Mar. 12, 2023

(65) Prior Publication Data

US 2024/0300029 A1 Sep. 12, 2024

(51) Int. Cl.

| | |
|---|---|
| ***B23B 29/12*** | (2006.01) |
| ***B23B 27/12*** | (2006.01) |
| ***B23B 29/24*** | (2006.01) |
| *B23B 29/04* | (2006.01) |

(52) U.S. Cl.

CPC .............. *B23B 29/12* (2013.01); *B23B 29/04* (2013.01); *B23B 2200/0461* (2013.01); *B23B 2200/3627* (2013.01); *B23B 2205/18* (2013.01)

(58) Field of Classification Search

CPC ............ B23B 29/12; B23B 2200/3627; B23B 2205/18; B23B 29/04; B23B 2200/0461

See application file for complete search history.

(56) References Cited

U.S. PATENT DOCUMENTS

| | | | |
|---|---|---|---|
| 280,148 A | | 6/1883 | Douglas |
| 1,577,952 A | | 3/1926 | William |
| 1,673,039 A | | 6/1928 | Brown |
| 2,630,732 A | | 3/1953 | Piazze |
| 3,368,265 A | | 2/1968 | Kirkham |
| 3,793,708 A | | 2/1974 | Watanabe et al. |
| 3,838,500 A | | 10/1974 | Wirfelt |
| 3,981,607 A | | 9/1976 | Jorgensen |
| 3,996,651 A | * | 12/1976 | Heaton ............... B23B 27/1662 407/104 |
| 4,018,112 A | | 4/1977 | Heaton et al. |
| 4,024,777 A | | 5/1977 | Fogarty |

(Continued)

FOREIGN PATENT DOCUMENTS

| | | |
|---|---|---|
| CN | 112620759 A | 4/2021 |
| DE | 2424790 A1 | 12/1975 |

(Continued)

OTHER PUBLICATIONS

Oct. 9, 2025 Non Final Rejection U.S. Appl. No. 18/182,351, 07 Pages.

(Continued)

*Primary Examiner* — Sara Addisu

(74) *Attorney, Agent, or Firm* — Christopher J. Owens

(57) ABSTRACT

A cutting system may include a tool and a stationary fixture. The tool may include a cam connected with a cutting insert. The stationary fixture may be spaced apart from the tool. The stationary fixture may include a moveable indexing pin moveable relative to the stationary fixture. The cam of the tool may be configured to be moved into contact with the moveable indexing pin of the stationary fixture, and the moveable indexing pin of the stationary fixture may be configured to cause the cam to rotate thereby indexing the cutting insert.

25 Claims, 11 Drawing Sheets

(56) References Cited

U.S. PATENT DOCUMENTS

| | | | | |
|---|---|---|---|---|
| 4,326,437 | A | 4/1982 | Fischer | |
| 4,408,507 | A | 10/1983 | Szewczyk | |
| 4,414,733 | A | 11/1983 | Janotik et al. | |
| 4,541,165 | A | 9/1985 | Sawai et al. | |
| 4,663,818 | A | 5/1987 | Erickson | |
| 5,733,073 | A | 3/1998 | Zitzlaff et al. | |
| 5,846,032 | A | 12/1998 | Murakami | |
| 5,855,457 | A * | 1/1999 | Arai | B23C 5/2208 407/53 |
| 6,158,928 | A | 12/2000 | Hecht | |
| 6,991,410 | B2 * | 1/2006 | Andras | B23B 27/1655 407/107 |
| 7,607,867 | B2 | 10/2009 | Benson | |
| 9,737,939 | B2 * | 8/2017 | Norstedt | B23C 5/06 |
| 9,981,324 | B2 * | 5/2018 | Norstedt | B23C 5/2213 |
| 11,786,982 | B2 * | 10/2023 | Dufour | B23C 5/2213 407/113 |
| 12,097,563 | B2 * | 9/2024 | Lindback | B23C 5/06 |
| 2005/0079019 | A1 * | 4/2005 | Andras | B23B 27/1655 407/107 |
| 2005/0166727 | A1 | 8/2005 | Peltonen et al. | |
| 2007/0009334 | A1 | 1/2007 | Edler | |
| 2008/0145159 | A1 | 6/2008 | Benson | |
| 2014/0186127 | A1 | 7/2014 | Parker et al. | |
| 2017/0028483 | A1 | 2/2017 | Norstedt et al. | |
| 2020/0331074 | A1 | 10/2020 | Endres | |
| 2021/0362247 | A1 | 11/2021 | Lindback et al. | |
| 2023/0294179 | A1 * | 9/2023 | da Silva | B23B 29/03403 408/19 |
| 2024/0300029 | A1 * | 9/2024 | Silva | B23B 29/12 |
| 2025/0269436 | A1 * | 8/2025 | Hecht | B23B 27/16 |

FOREIGN PATENT DOCUMENTS

| | | | |
|---|---|---|---|
| DE | 4411400 | A1 | 11/1995 |
| DE | 19846548 | A1 | 5/2000 |
| DE | 102013222206 | A1 | 4/2015 |
| EP | 0183907 | A1 | 6/1986 |
| EP | 0350938 | A1 | 1/1990 |
| EP | 3064299 | A1 | 9/2016 |
| GB | 1137652 | A | 12/1968 |
| JP | S5537220 | A | 3/1980 |
| JP | S5537221 | A | 3/1980 |
| JP | S5537222 | A | 3/1980 |
| JP | H03281105 | A | 12/1991 |
| WO | 16193170 | A1 | 12/2016 |
| WO | 2019242897 | A1 | 12/2019 |

OTHER PUBLICATIONS

Apr. 16, 2026 Notice of Allowance U.S. Appl. No. 18/182,351, 07 Pages.

* cited by examiner

AUTOMATIC INDEXING FOR CUTTING INSERT

FIELD OF THE DISCLOSURE

The disclosure relates to a cutting system which automatically indexes a cutting insert.

BACKGROUND

Cutting inserts of cutting systems may be indexed to switch-out the portion of the cutting insert doing the cutting to extend the life of the cutting insert. Existing cutting systems and methods of their use often utilize complicated motorized indexing systems. This may lead to additional cost, costly repairs, and more down-time.

An improved cutting system and method of its use is needed to reduce one or more of the issues associated with indexing one or more of the existing cutting systems and methods of their use.

SUMMARY

In one embodiment, a cutting system is disclosed. The cutting system may include a tool and a stationary fixture. The tool may include a cam connected with a cutting insert. The stationary fixture may be spaced apart from the tool. The stationary fixture may include a moveable indexing pin moveable relative to the stationary fixture. The cam of the tool may be configured to be moved into contact with the moveable indexing pin of the stationary fixture, and the moveable indexing pin of the stationary fixture may be configured to cause the cam to rotate thereby indexing the cutting insert.

In another embodiment, a cutting system is disclosed. The cutting system may include a machine, a tool, and a stationary fixture. The tool may include a cam connected with a cutting insert. The stationary fixture may be spaced apart from the tool. The stationary fixture may include a stationary pin and a moveable indexing pin moveable relative to the stationary fixture. The machine may be configured to move the cam into contact with the stationary pin and the moveable indexing pin of the stationary fixture. As the machine moves the tool relative to the stationary fixture, the moveable indexing pin of the stationary fixture may be configured to cause the cam to rotate thereby indexing the cutting insert.

In still another embodiment, a method of indexing a cutting insert of a tool may be disclosed. In one step, the tool may be moved with a machine to dispose a cam of the tool into contact with a moveable indexing pin of a stationary fixture. In another step, the cam may be rotated with the moveable indexing pin of the stationary fixture, as the machine moves the tool relative to the stationary fixture, causing the cutting insert of the tool to index.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
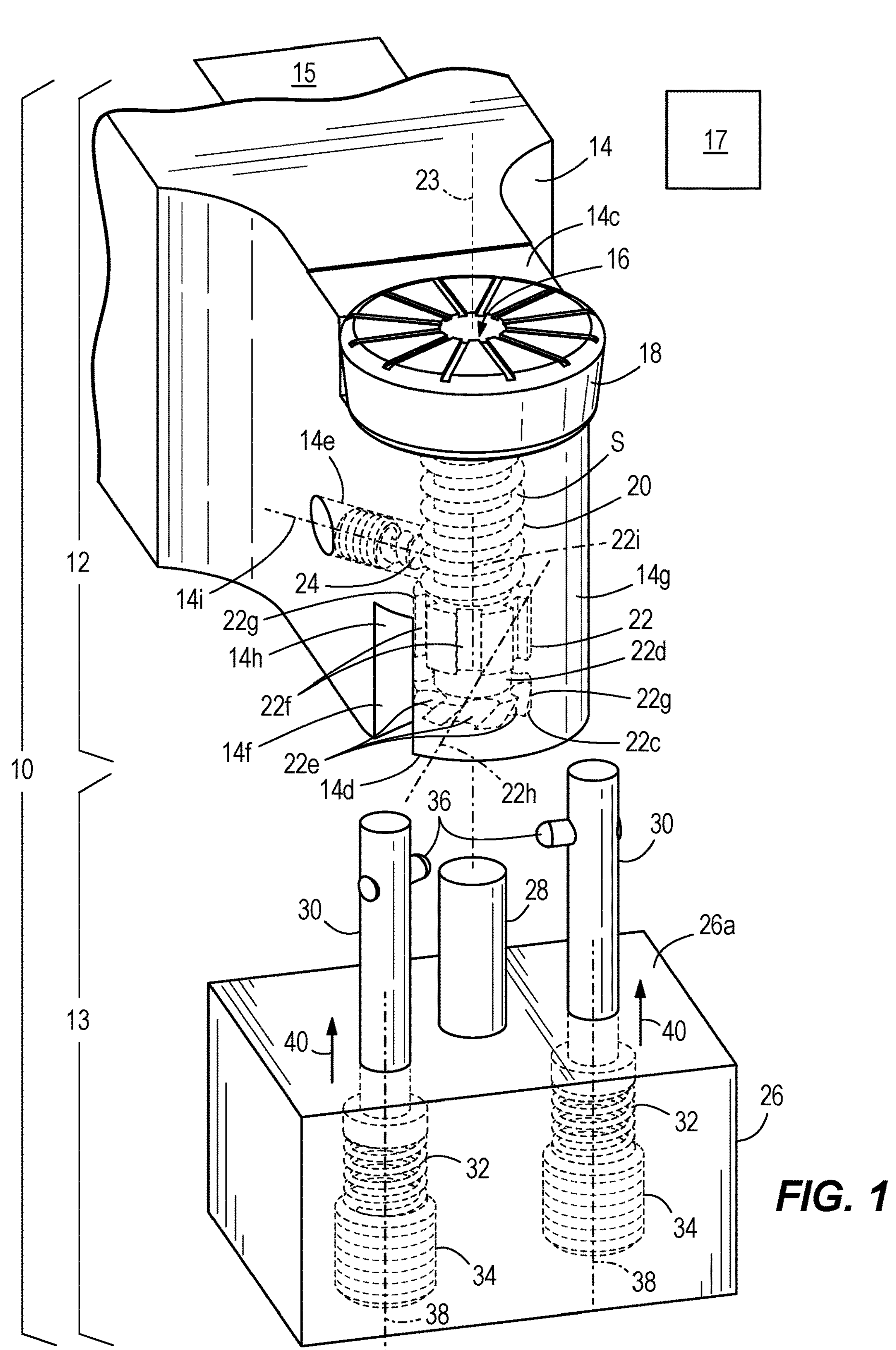
FIG. 1 illustrates a top perspective view of one embodiment of a cutting system with a tool of the cutting system spaced-apart from a stationary fixture of the cutting system.
Figure 2:
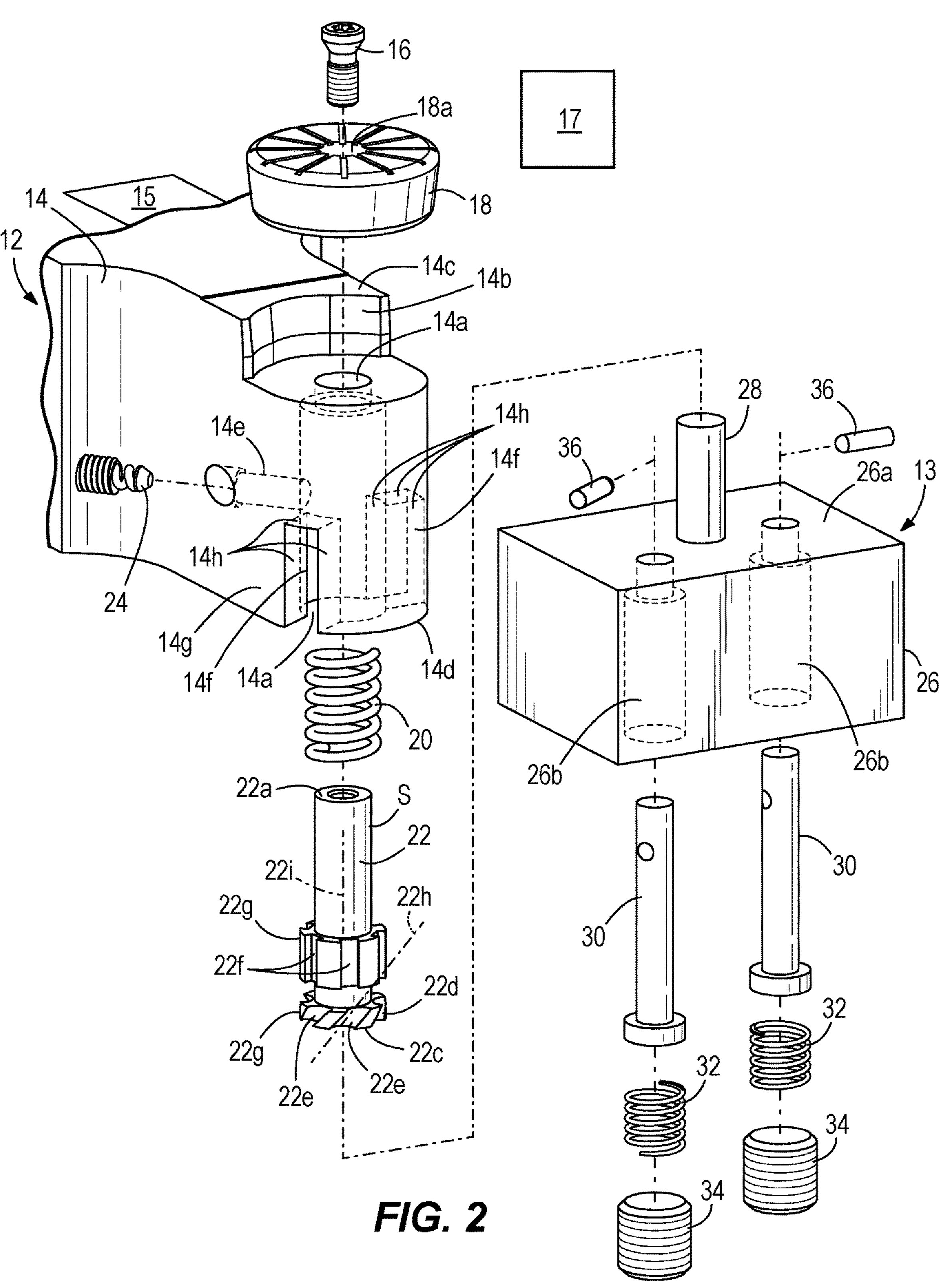
FIG. 2 illustrates a disassembled view of the cutting system of FIG. 1.

As shown collectively in FIGS. 1-2, in one embodiment a cutting system 10 may include a tool 12, a stationary fixture 13, a machine 15, and a processor 17. The machine 15 may be controlled by the processor 17 to move the tool 12.

The tool 12 may comprise a tool holder 14, a fastening member 16, a cutting insert 18, a biasing member 20, a cam 22, and a plunger 24. A shaft **22*a* of the cam 22 may disposed within a through-hole 14*a* in the tool holder 14. The biasing member 20 may extend over the shaft 22*a* in the through-hole 14*a* of the tool holder 14. The biasing member 20 may comprise a spring. In other embodiments, the biasing member 20 may vary. The fastening member 16 may attach the cutting insert 18 to the cam 22. The fastening member 16 may comprise a screw. The fastening member 16 may extend through a hole 18*a* in the cutting insert 18 and be threadedly attached to one end 22*b* of the cam 22 connecting the cam 22 with the cutting insert 18. The cutting insert 18 may be cylindrical. The cutting insert 18 may be disposed within and against a pocket 14***b* at one end 14*c* of the tool holder 14 with an interference fit preventing the cutting insert 18 from rotating relative to the pocket 14*b*. The cam 22 and attached cutting insert 18 may be moveably disposed vertically relative to the tool holder 14 along axis 23. This relative movement along axis 23 may allow the cutting insert 18 to be relatively moved vertically out of the interference fit of the pocket 14*b* to allow the cutting insert 18, and attached cam 22, to rotate around axis 23 relative to the tool holder 14. The biasing member 20 may bias the cutting insert 18 along axis 23 towards the pocket 14*b*.

Another end 22*c* of the cam 22 may comprise a circumferential slot 22*d* disposed between two sets of spaced-apart slots 22*e* and 22*f*. Each of the respective sets of the spaced-apart slots 22*e* and 22*f* may be disposed around an outer surface 22*g* of the cam 22. Each of the spaced-apart slots 22*e* may extend along a respective longitudinal axis 22*h* which is disposed at a non-parallel angle relative to the axis 23 around which the cam 22 is configured to rotate. Each of the spaced-apart slots 22*f* may extend along a respective longitudinal axis 22*i* which is disposed at a parallel angle relative to the axis 23 around which the cam 22 is configured to rotate. The circumferential slot 22*d* may extend around the outer surface 22*g* of the cam 22. Each of the respective sets of the spaced-apart slots 22*e* and 22*f* may intersect the circumferential slot 22*d*.

The plunger 24 may be disposed through a through-hole 14*e* in the tool holder 14. The through-hole 14*e* may intersect the through-hole 14*a*. The plunger 24 may be moveably disposed back and forth along axis 14*i* within the through-hole 14*e*. The plunger 24 may be disposed against a shaft S of the cam 20. The plunger 24 may prevent the cam 20 from rotating.

The tool holder 14 may comprise opposed slots 14*f* extending through an outer surface 14*g* of the tool holder 14 and connecting with the through-hole 14*a*. Each of the opposed slots 14*f* may comprise inner walls 14*h* forming the opposed slots 14*f*.

The stationary fixture 13 may be spaced apart from the tool 12. The stationary fixture 13 may comprise a stationary housing 26, a stationary pin 28, moveable indexing pins 30, biasing members 32, and fastening members 34. The stationary pin 28 may be attached to an outer surface 26*a* of the stationary housing 26. The moveable indexing pins 30 may be partially disposed within and partially extend out of through-holes 26*b* of the stationary housing 26. The moveable indexing pins 30 may comprise respective indexing pins 36. The respective indexing pins 36 may extend perpendicularly from their respective moveable indexing pins 30. The biasing members 32 may be attached to and between the moveable indexing pins 30 and the fastening members 34 within the respective through-holes 26*b* of the housing 26. The fastening members 34 may attach the respective biasing members 32 within the through-holes 26*b* to the stationary housing 26. The fastening members 34 may comprise screws. In other embodiments, the fastening members 34 may vary.

The moveable indexing pins 30 may extend from the outer surface 26*a* of the stationary housing 26 on opposite sides of the stationary pin 28. The moveable indexing pins 30 may be spaced apart from one another and from the stationary pin 28. The indexing pins 36 may extend from their respective moveable indexing pins 30 towards the stationary pin 28. The moveable indexing pins 30 may be moveable relative to the stationary housing 26. The moveable indexing pins 30 may only be configured to move relative to the stationary housing 26 along their respective longitudinal axis 38 vertically towards and vertically away from the outer surface 26*a* of the stationary housing 26. The moveable indexing pins 30 may not be configured to rotate. The biasing members 32 may be configured to bias the respective moveable indexing pins 30 relative to the stationary housing 26 in direction 40 along their respective longitudinal axis 38.

As discussed in more detail below, the processor 17 may cause the machine 15 to move the tool 12 relative to the stationary fixture 13 so that the stationary fixture 13 automatically indexes the cutting insert 18. This may comprise the machine 15 moving the tool housing 14 causing the cam 22 of the tool 12 to come into contact with an indexing pin 36 of one of the moveable indexing pins 30 of the stationary fixture 13. The indexing pin 36 of the moveable indexing pin 30 in contact with the cam 22 of the tool 12 may cause the cam 22 and the attached cutting insert 18 to rotate and index as the machine 15 moves the tool 12 relative to the stationary fixture 13 as more thoroughly described below. The stationary fixture 13 may be purely mechanical without any motor or electronic components.

Figure 3:
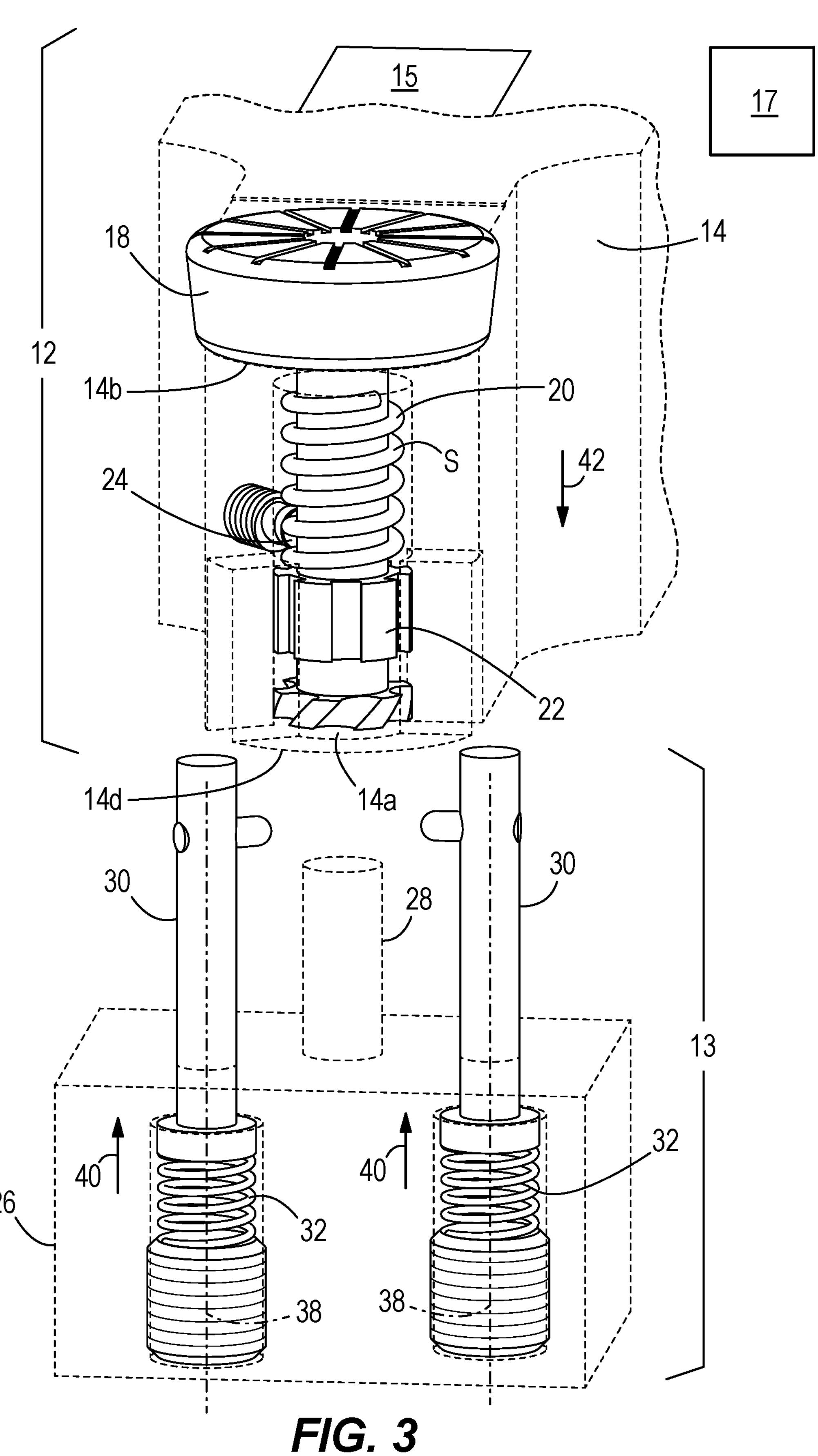
FIG. 3 illustrates a top perspective view of the cutting system of FIG. 1 with the tool disposed directly over and spaced-apart from the stationary fixture.

At the start of an indexing action, as shown in FIG. 3, the processor 17 may cause the machine 15 to dispose the tool holder 14 in a raised position with the cam 22 disposed in spaced-apart relation directly over the stationary pin 28 of the stationary fixture 13. In this position, the tool 12 may be spaced-apart from the stationary fixture 13 with the tool holder 14 disposed spaced-apart from the stationary pin 28 and the moveable indexing pins 30 of the stationary fixture 13. The cam 22 may be disposed completely within the through-hole 14*a* of the tool holder 14 adjacent the end 14*d* of the tool holder 14. Due to the biasing member 20 of the tool 12 biasing the cutting insert 18 towards the pocket 14*b*, the cutting insert 18 may be disposed within and against the pocket 14*b* of the tool holder 14 prevented from rotating due to the interference fit of the pocket 14*b* against the cutting insert 18. The plunger 24 may be disposed against the shaft S of the cam 22 preventing the cam 22 from rotating. The moveable indexing pins 30 of the stationary fixture 13 may be disposed in raised positions relative to the stationary housing 26 of the stationary fixture 13 due to their respective biasing members 32 of the stationary fixture 13 biasing the moveable indexing pins 30 in direction 40 along their respective longitudinal axis 38.

Figure 4:
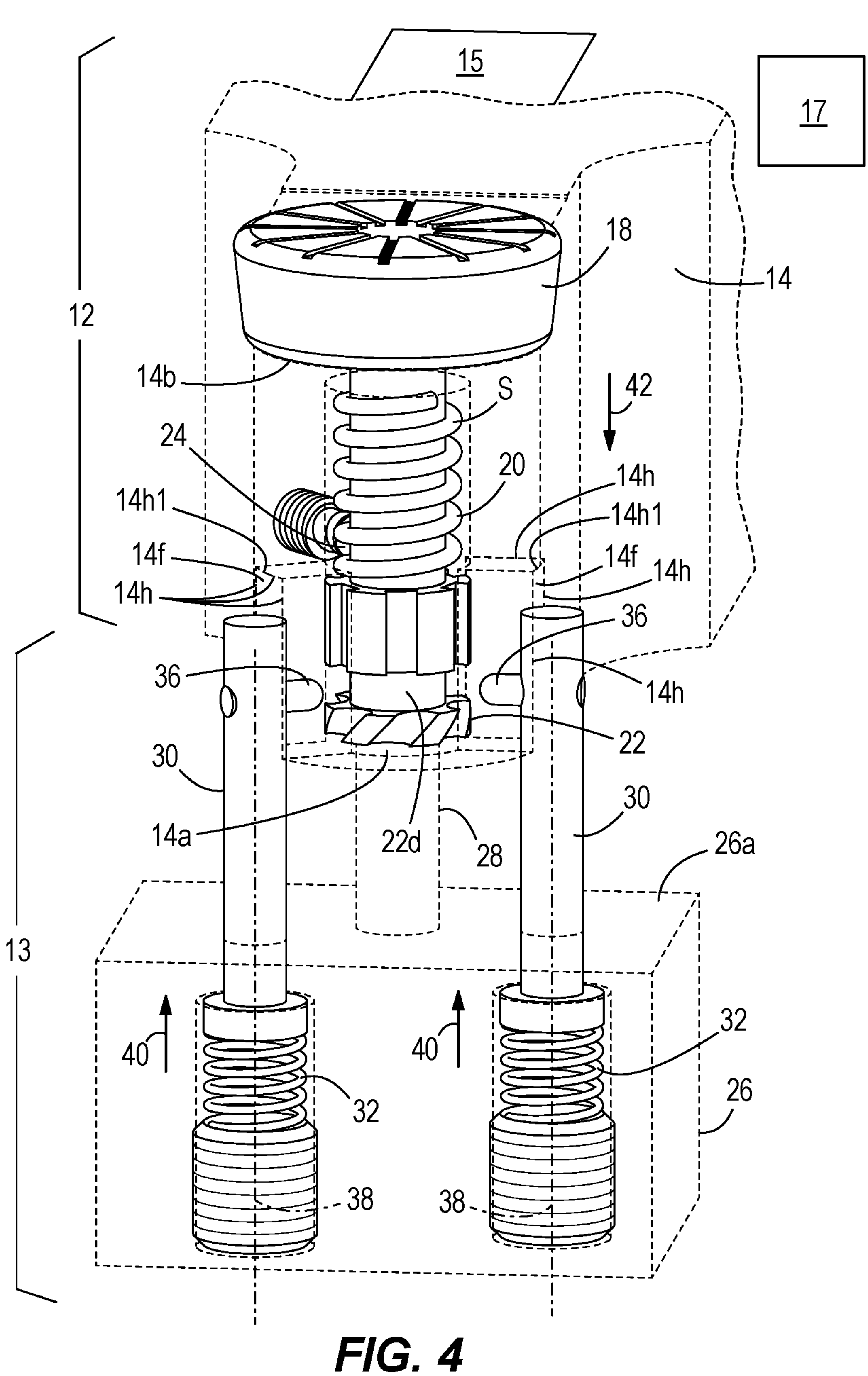
FIG. 4 illustrates a top perspective view of the cutting system of FIG. 3 with a machine of the cutting system having moved a tool holder of the cutting system towards the stationary fixture to dispose a cam of the tool into contact with a stationary pin of the stationary fixture.

The processor 17 may then cause the machine 15 to move the tool holder 14 from the position of FIG. 3 in direction 42 towards the outer surface 26*a* of the housing 26 of the stationary fixture 13 to the intermediate position of FIG. 4 with the cam 22 coming into contact with the stationary pin 28 of the stationary fixture 13 preventing the cam 22 from moving further in direction 42. In this position, the tool 12 may now be in contact with the stationary fixture 13. The cam 22 may not yet have moved relative to the tool holder 14 within the through-hole 14*a* of the tool holder 14. The moveable indexing pins 30 may be disposed in the respective opposed slots 14*f* of the tool holder 14 with the indexing pins 36 in alignment within the opposed slots 14*f* of the tool holder 14. The indexing pins 36 may be nearing alignment with the circumferential slot 22*d* of the cam 22. The moveable indexing pins 30 may not yet be in contact with the inner walls 14*h*, particularly the top inner walls 14*h*1. Likewise, the indexing pins 36 may not yet be in contact with the circumferential slot 22*d* or any portion of the cam 22. Due to the biasing member 20 of the tool 12 biasing the cutting insert 18 towards the pocket 14*b*, the cutting insert 18 may still be disposed within and against the pocket 14*b* of the tool holder 14 prevented from rotating due to the interference fit of the pocket 14*b* against the cutting insert 18. The plunger 24 may be disposed against the shaft S of the cam 22 preventing the cam 22 from rotating. The moveable indexing pins 30 of the stationary fixture 13 may still be disposed in raised positions relative to the stationary housing 26 of the stationary fixture 13 due to their respective biasing members 32 of the stationary fixture 13 continuing to bias the moveable indexing pins 30 in direction 40 along their respective longitudinal axis 38.

Figure 5:
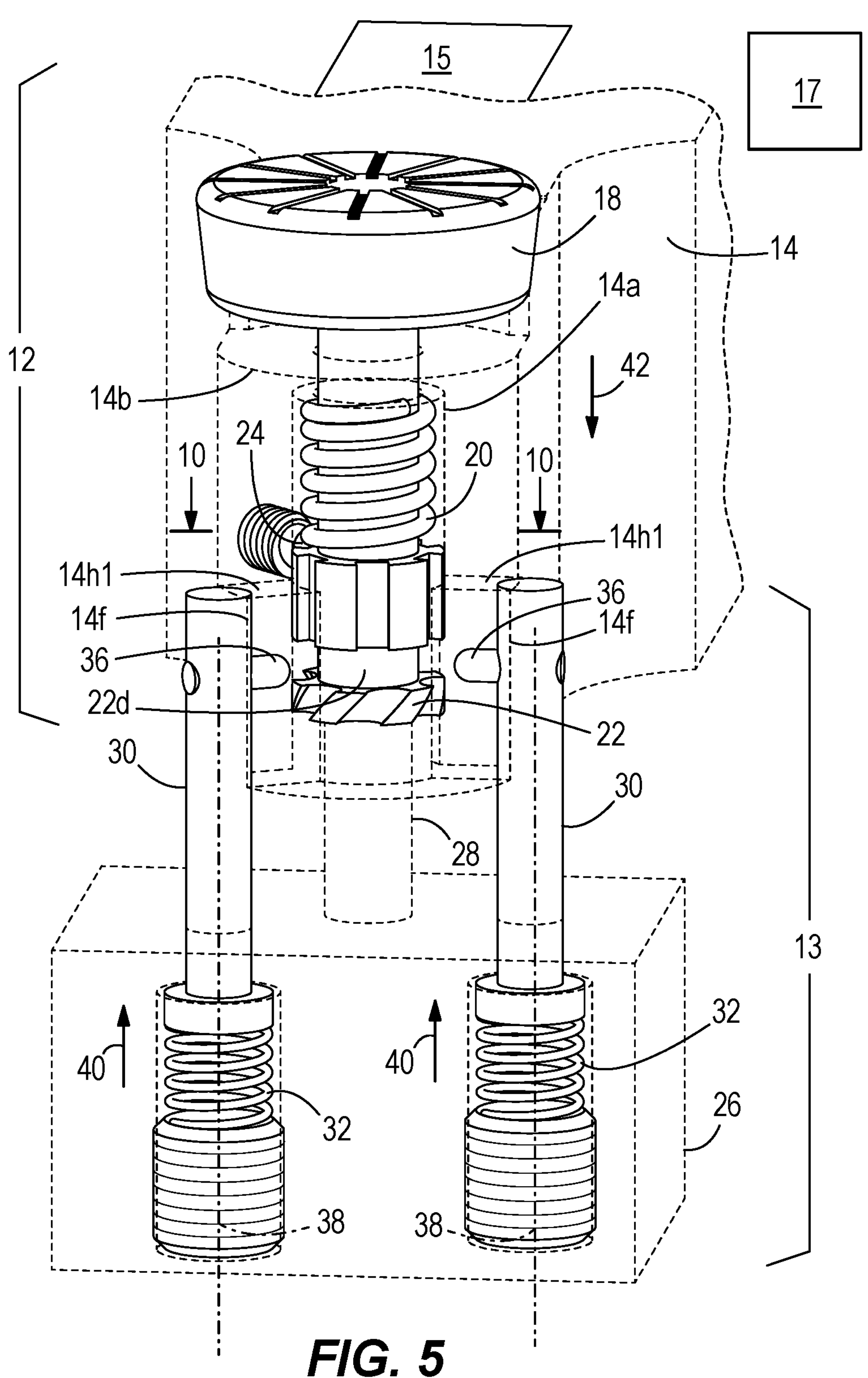
FIG. 5 illustrates a top perspective view of the cutting system of FIG. 4 with the machine having moved the tool holder further towards the stationary fixture with the cam restrained against the stationary pin to force a cutting insert of the tool to move out of a pocket of the tool holder.
Figure 10:
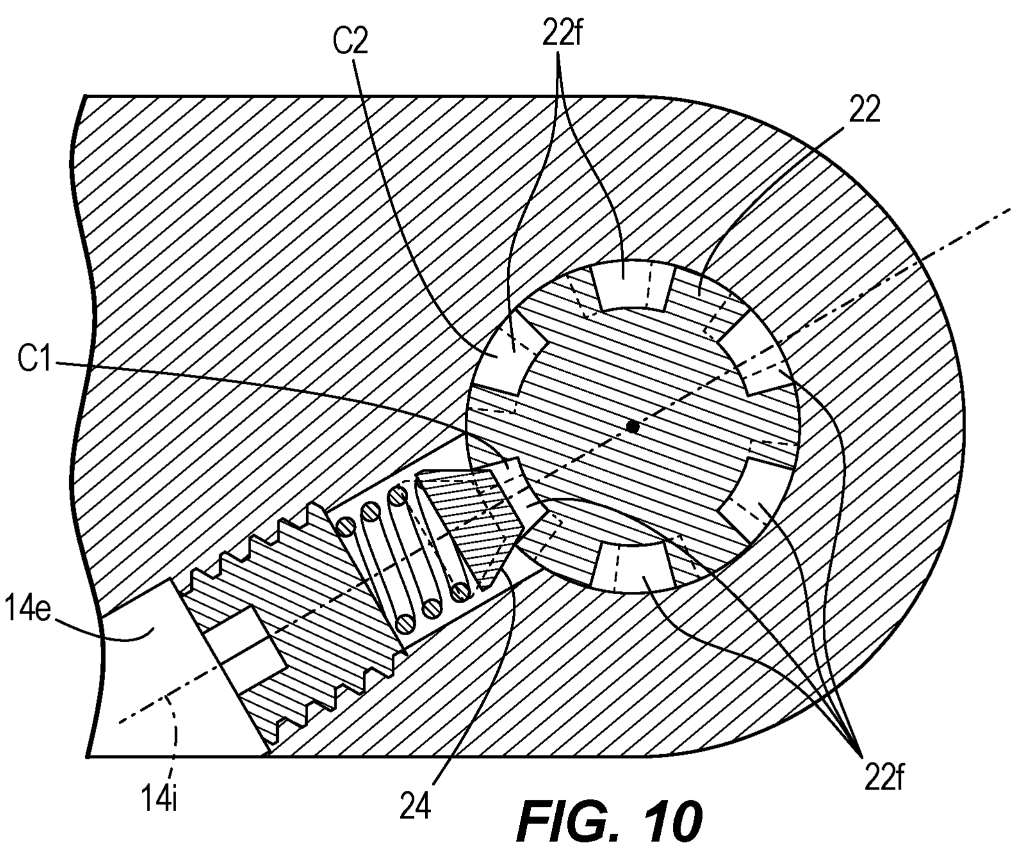
FIG. 10 illustrates a cross-section view through line 10-10 of FIG. 5 showing a plunger of the tool keeping a position of the cam prior to indexing.

The processor 17 may then cause the machine 15 to move the tool holder 14 from the intermediate position of FIG. 4 further in direction 42 towards the stationary fixture 13 to the lowered position of FIG. 5 with the cam 22 prevented by the stationary pin 28 of the stationary fixture 13 from moving further in direction 42. This may cause the cam 22 to move relative to the tool holder 14 within the through-hole 14*a* of the tool holder 14 due to the tool holder 14 moving in direction 42 relative to the cam 22 which may be stationary due to the stationary pin 28 restraining its movement. This movement of the tool holder 14 relative to the cam 22 may cause the cutting insert 18 to be relatively moved away from the pocket 14*b* of the tool holder 14. The moveable indexing pins 30 may still be disposed in the respective opposed slots 14*f* of the tool holder 14 with the indexing pins 36 aligned within the opposed slots 14*f* of the tool holder 14. The indexing pins 36 may now have moved to be in complete alignment with the circumferential slot 22*d* of the cam 22, although not yet in contact with the circumferential slot 22*d*. The moveable indexing pins 30 may now be in contact with the respective top inner walls 14*h*1 of the respective opposed slots 14*f* of the tool holder 14. During this movement of the tool holder 14 in direction 42, the biasing member 20 of the tool 12 may have compressed in direction 42. The movement of the tool holder 14 relative to the cutting insert 18 may have caused the cutting insert 18 to no longer be constrained from rotation due to the interference fit of the pocket 14*b* having been removed from the cutting insert 18. At this moment, as shown in FIG. 10, the plunger 24 may be disposed in a first one C1 of the spaced-apart slots 22*f* of the cam 22 preventing the cam 22 and attached cutting insert 18 from rotating and keeping a pre-indexed position. The moveable indexing pins 30 of the stationary fixture 13 may still be disposed in raised positions relative to the stationary housing 26 of the stationary fixture 13 due to their respective biasing members 32 of the stationary fixture 13 continuing to bias the moveable indexing pins 30 in direction 40 along their respective longitudinal axis 38.

Figure 6:
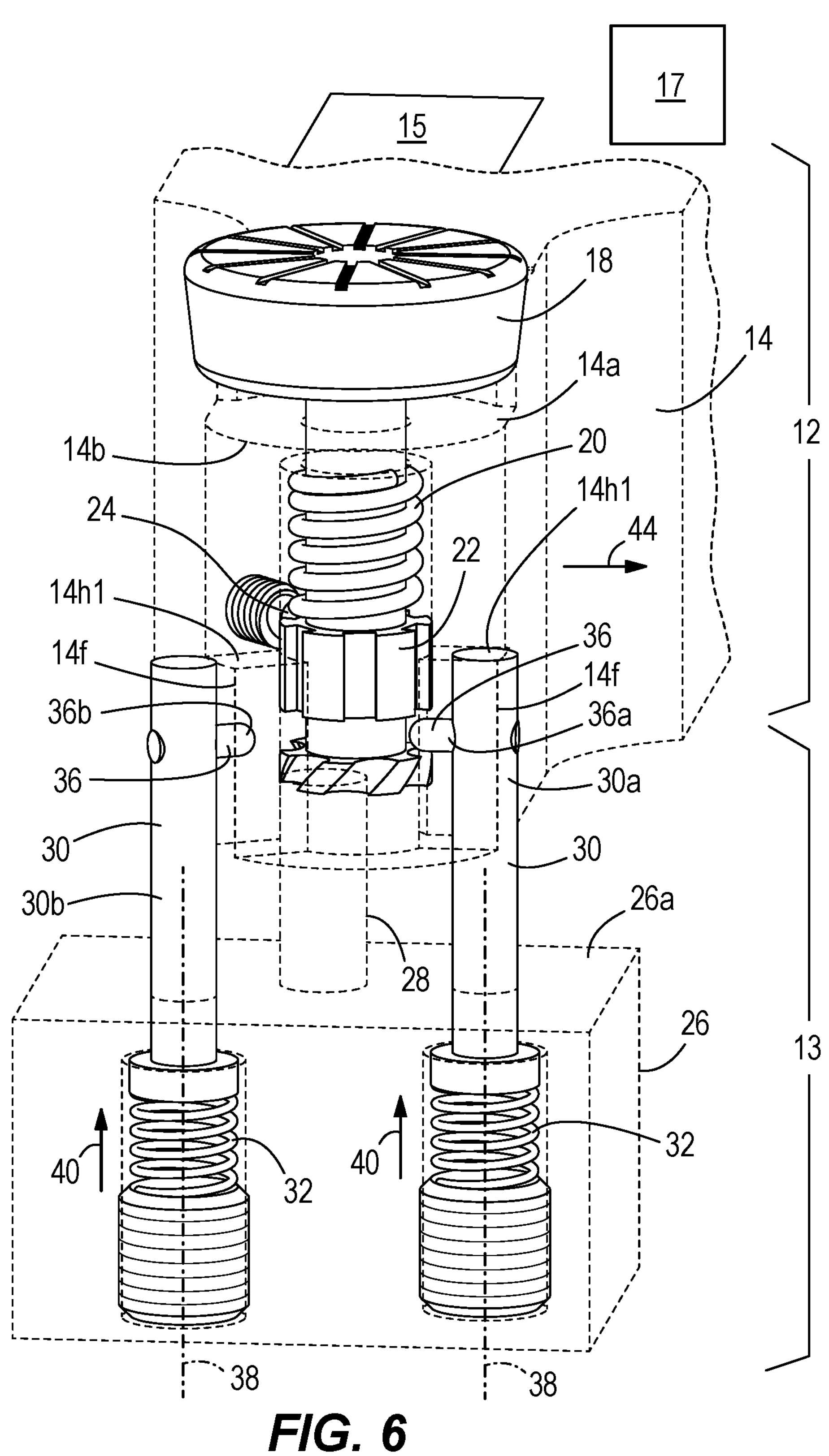
FIG. 6 illustrates the top perspective view of the cutting system of FIG. 5 with the machine having moved the tool holder laterally and parallel to the stationary fixture to cause an indexing pin of a moveable indexing pin to be aligned within a circumferential slot of the cam.

The processor 17 may then cause the machine 15 to move the tool holder 14 laterally from the position of FIG. 5 in direction 44 parallel to outer surface 26*a* of housing 26 of the stationary fixture 13 into the position of FIG. 6. This may cause the cam 22 and attached cutting insert 18 to move with the tool holder 14 laterally in direction 44 relative to the stationary fixture 13. During this movement, the cam 22 may move relative to but remain abutted against the stationary pin 28. Similarly, during this movement the tool holder 14 may move relative to the moveable indexing pins 30. This movement may cause the tool holder 14 and cam 22 to move towards moveable indexing pin 30*a* and away from moveable indexing pin 30*b* as the top inner walls 14*h*1 of the opposed slots 14*f* of the tool holder 14 slide in direction 44 relative to and against the respective moveable indexing pins 30*a* and 30*b* which remain stationary. Due to the movement of the cam 22 in direction 44, indexing pin 36*a* may now be disposed against the circumferential slot 22*d* of the cam 22 while indexing pin 36*b* may be disposed apart from the circumferential slot 22*d*. During this movement, the cutting insert 18 may remain in its position moved away from the pocket 14*b* of the tool holder 14 while the biasing member 20 of the tool 12 remains compressed. As shown best in FIG. 10, the plunger 24 may still be disposed in a first one C1 of the spaced-apart slots 22*f* of the cam 22 keeping the cam 22 and attached cutting insert 18 from rotating and keeping a pre-indexed position. The moveable indexing pins 30 of the stationary fixture 13 may still be disposed in raised positions relative to the stationary housing 26 of the stationary fixture 13 due to their respective biasing members 32 continuing to bias the moveable indexing pins 30 in direction 40 along their respective longitudinal axis 38.

Figure 7:
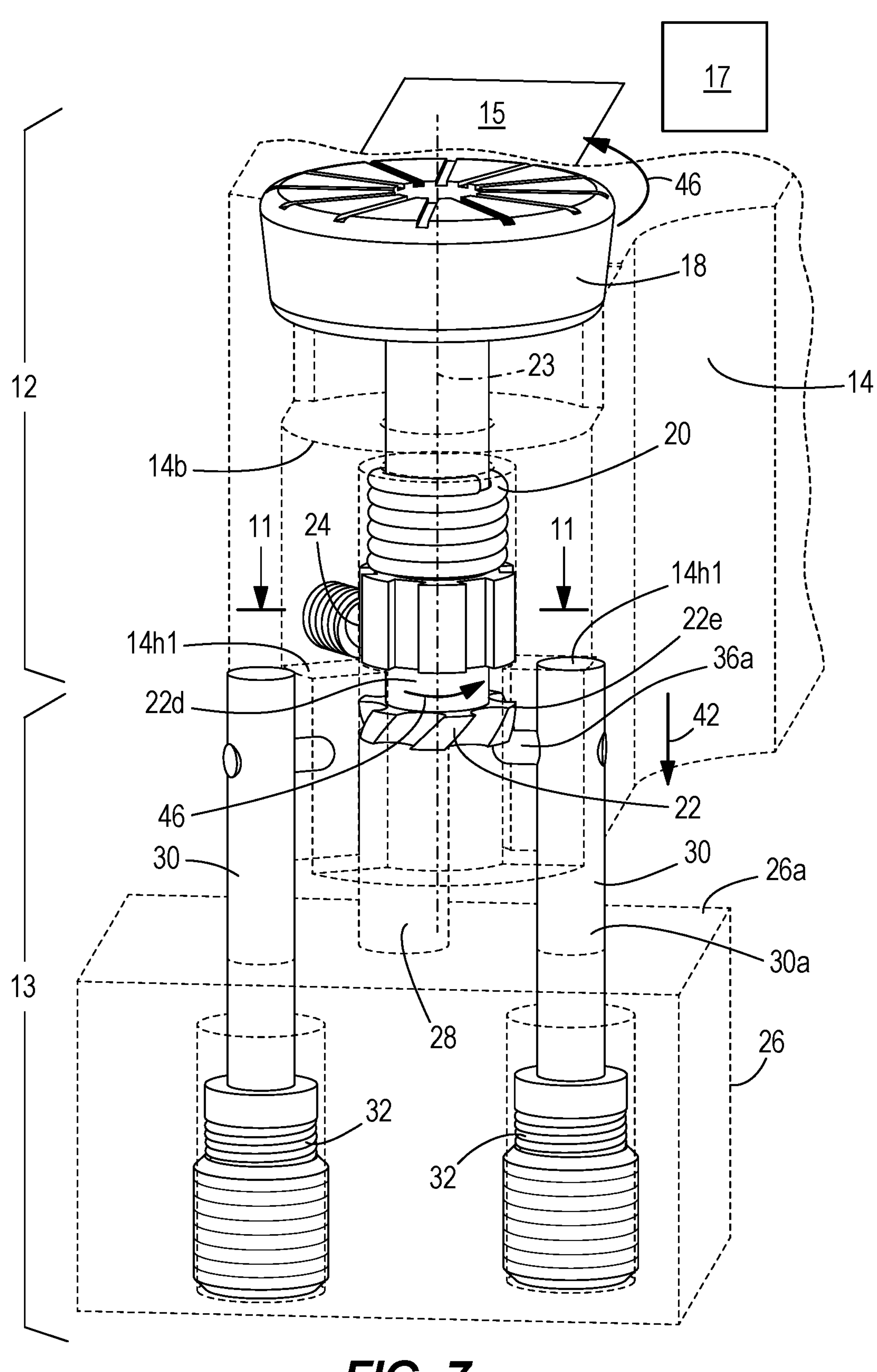
FIG. 7 illustrates the top perspective view of the cutting system of FIG. 6 with the machine having moved the tool holder more towards the stationary fixture with the indexing pin of the moveable indexing pin moving relative to and along an angled slot of the cam causing the cam and the connected cutting insert to rotate and index.
Figure 11:
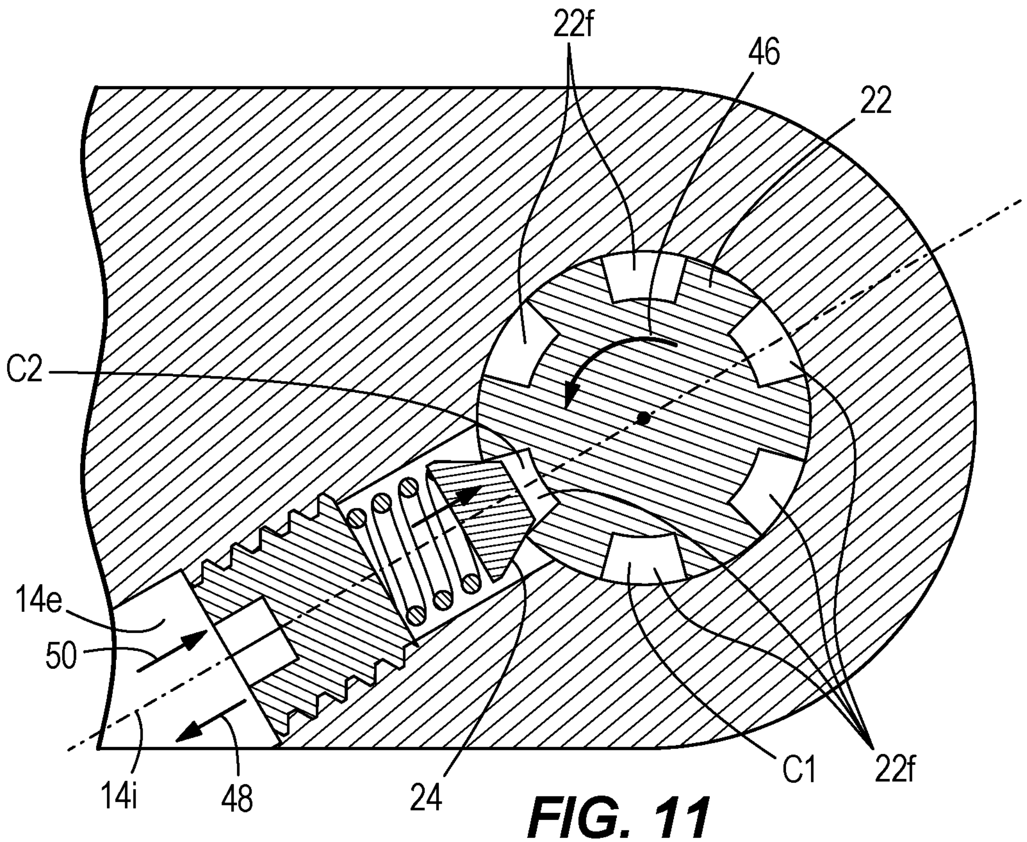
FIG. 11 illustrates a cross-section view through line 11-11 of FIG. 7 showing the plunger of the tool keeping a rotated position of the cam after indexing.

The processor 17 may then cause the machine 15 to move the tool holder 14 vertically from the position of FIG. 6 in direction 42 towards the outer surface 26*a* of housing 26 of the stationary fixture 13 into the position of FIG. 7. The movement of the tool holder 14 in direction 42 may cause the top inner walls 14*h*1 of the tool holder 14, which may be abutted against the respective moveable indexing pins 30, to force the moveable indexing pins 30 to also move in direction 42 towards the outer surface 26*a* of the housing 26 of the stationary fixture 13 into lowered positions. This may cause the biasing members 32 of the stationary fixture 13 to compress in direction 42. During this time, the cam 22 and attached cutting insert 18 may be prevented by the stationary pin 28 from moving in direction 42 due to the cam 22 being abutted against the stationary pin 28. As the moveable indexing pins 30 move in direction 42 without rotating, the indexing pin 36*a* of moveable indexing pin 30*a* may also move in direction 42 causing the cam 22 and attached cutting insert 18 to rotate in direction 46 as the moveable indexing pin 30*a* moves from the circumferential slot 22*d* to and along the respective spaced-apart slot 22*e* of the cam 22. This rotation of the cam 22 and attached cutting insert 18 in direction 46 may be caused as a result of the spaced-apart slot 22*e* of the cam 22 being disposed at the non-parallel angle relative to the axis 23 around which the cam 22 rotates. At this time, the biasing member 20 of the tool 12 may remain compressed with the cutting insert 18 in its extended position away from the pocket 14*b* allowing the cutting insert 18 to rotate. As the cutting insert 18 and cam 22 rotate and index in direction 46, as best shown in FIG. 11, the plunger 24 may retract along axis 14*i* in direction 48 and, due to the rotation of the cam 22 in direction 46 relative to the plunger 24, may then move in direction 50 to be disposed in a second one C2 of the spaced-apart slots 22*f* of the cam 22 keeping a rotated position of the cam 22 and attached cutting insert 18 after they index.

Figure 8:
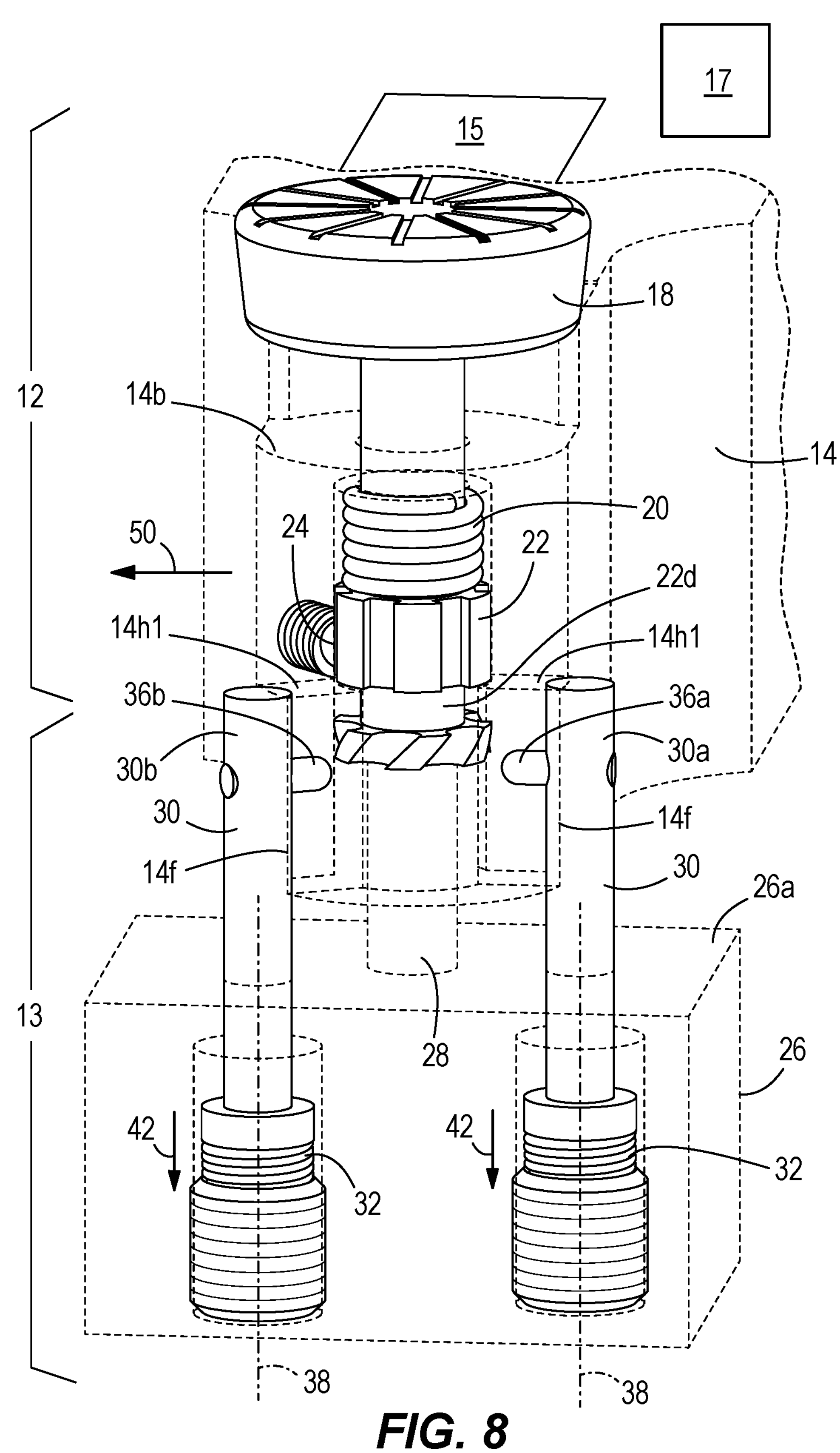
FIG. 8 illustrates the top perspective view of the cutting system of FIG. 7 with the machine having moved the tool holder laterally and parallel to the stationary fixture to cause the cam to be disposed apart from the indexing pin of the moveable indexing pin.

The processor 17 may then cause the machine 15 to move the tool holder 14 laterally from the position of FIG. 7 in direction 50 parallel to outer surface 26*a* of housing 26 of the stationary fixture 13 into the position of FIG. 8. This may cause the cam 22 and attached cutting insert 18 to move with the tool holder 14 laterally in direction 50 relative to the stationary fixture 13. During this movement, the cam 22 may move relative to but remain abutted against the stationary pin 28. Similarly, during this movement the tool holder 14 may move relative to the moveable indexing pins 30. This movement may cause the tool holder 14 and cam 22 to move towards moveable indexing pin 30*b* and away from moveable indexing pin 30*a* as the top inner walls 14*h*1 of the opposed slots 14*f* of the tool holder 14 slide in direction 50 relative to and against the respective moveable indexing pins 30*a* and 30*b* which remain stationary. Due to the movement of the cam 22 in direction 50, indexing pins 36*a* and 36*b* may now both be disposed spaced-apart from the circumferential slot 22*d* of the cam 22. During this movement, the cutting insert 18 may remain in its position moved away from the pocket 14*b* of the tool holder 14 while the biasing member 20 of the tool 12 remains compressed. As shown best in FIG. 11, the plunger 24 may still be disposed in a second one C2 of the spaced-apart slots 22*f* of the cam 22 keeping a rotated position of the cam 22 and attached cutting insert 18 after they were indexed. The moveable indexing pins 30 of the stationary fixture 13 may still be disposed in their lowered positions relative to the stationary housing 26 of the stationary fixture 13 due to their respective biasing members 32 continuing to bias the moveable indexing pins 30 in direction 42.

Figure 9:
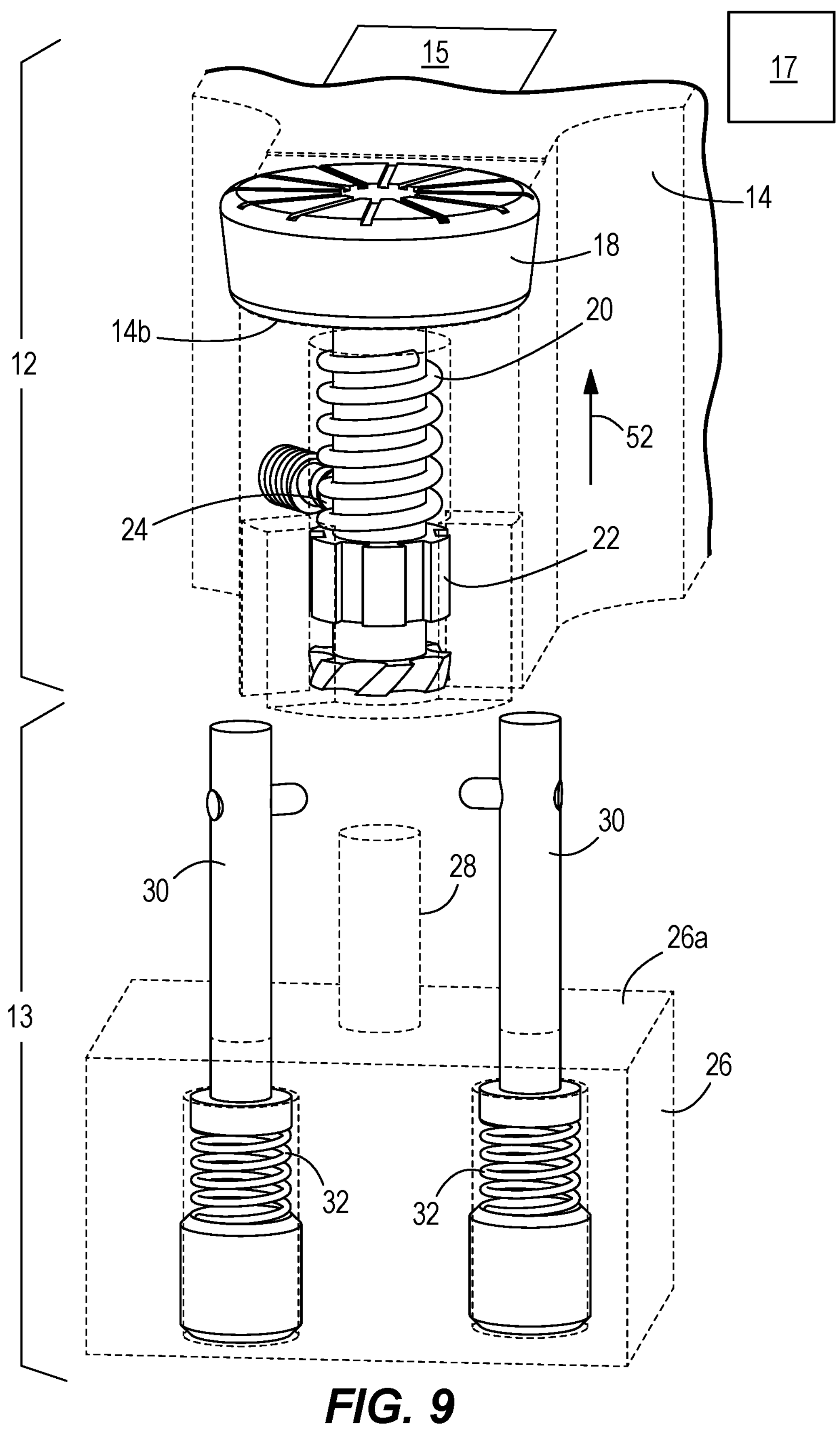
FIG. 9 illustrates the top perspective view of the cutting system of FIG. 8 with the machine having moved the tool holder away from the stationary fixture to cause the cam to be disposed apart from the stationary pin.

The processor 17 may then cause the machine 15 to move the tool holder 14 vertically from the position of FIG. 8 in direction 52 away from outer surface 26*a* of housing 26 of the stationary fixture 13 into the position of FIG. 9. The tool holder 14 may move far enough away from the outer surface 26*a* in direction 52 to cause the cam 22 to move in direction 52 apart from the stationary pin 28 so that no portion of the tool 12 is in contact with the stationary fixture 13 including the stationary pin 28 and the moveable indexing pins 30. At this time, the cam 22 may be disposed directly above the stationary pin 28 in direct alignment. The separation of the cam 22 from the stationary pin 28 may cause the biasing members 32 to move the respective moveable indexing pins 30 in direction 52 back into their extended positions. Similarly, the separation of the cam 22 from the stationary pin 28 may cause the biasing member 20 to relatively move the cutting insert 18 back into the pocket 14*b* of the tool holder 14. At this time, the interference fit of the pocket 14*b* may again restrict the cutting insert 18 from rotating. The plunger 24 may remain in its position of FIG. 11 disposed in the second one C2 of the spaced-apart slots 22*f* of the cam 22 keeping a rotated position of the cam 22 and attached cutting insert 18 after they were indexed.

The processor 17 may then cause the machine 15 to move the tool holder 14 to repeat the process of FIGS. 3-9 by moving the tool holder 14 relative to the stationary fixture 13 to further index the cam 22 and cutting insert 18. Either of the indexing pins 36*a* and 36*b* of the respective moveable indexing pins 30*a* and 30*b* may be used during this process to index the cam 22 and connected cutting insert 18. To use the indexing pin 36*b* of moveable indexing pin 30*b*, the processor 17 may have the machine 15 move the tool 12, tool holder 14, and cam 22 towards the indexing pin 36*b* rather than towards the indexing pin 36*a* as described above. In other embodiments, any number, configuration, and type of moveable indexing pins 30 of a stationary fixture 13 may be utilized to index a cam 22 and connected cutting insert 18 varying amounts.

Figure 12:
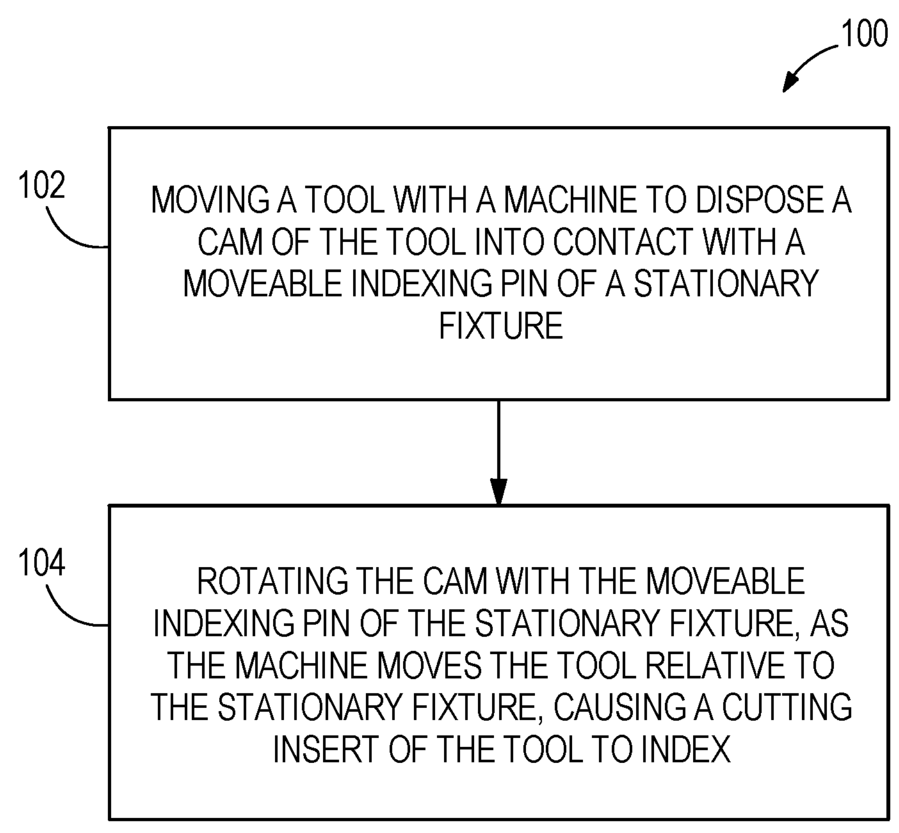
FIG. 12 illustrates a flowchart showing one embodiment of a method of indexing a cutting tool.

FIG. 12 illustrates one embodiment of a method 100 of indexing a cutting insert of a tool. The method 100 may utilize any of the embodiments of the cutting system 10 of FIGS. 1-11. In other embodiments the method 100 may utilize varying cutting systems.

In step 102, the tool may be moved with a machine to dispose a cam of the tool into contact with a moveable indexing pin of a stationary fixture. Subsequently, in step 104, the cam may be rotated with the moveable indexing pin of the stationary fixture, as the machine moves the tool relative to the stationary fixture, causing the cutting insert of the tool to index. Step 104 may be done automatically using the stationary fixture. The stationary fixture may be purely mechanical without any motor or electronic components.

In another embodiment of the method 100 of FIG. 12, in one step rotation of the cutting insert may be prevented within a pocket of a tool holder of the tool.

In an additional embodiment of the method 100 of FIG. 12, another step may comprise moving the pocket of the tool holder away from the cutting insert to allow the cutting insert to rotate.

In still another embodiment of the method 100 of FIG. 12, the machine may move the tool holder relative to the cam of the tool while the cam of the tool is restrained against a stationary pin of the stationary fixture causing the pocket of the tool holder to be moved away from the cutting insert.

In another embodiment of the method 100 of FIG. 12, the rotating the cam with the moveable indexing pin of the stationary fixture, as the machine moves the tool relative to the stationary fixture, may comprise the tool moving the moveable indexing pin towards the stationary fixture causing the cam to rotate and the cutting insert of the tool to index.

In an additional embodiment of the method 100 of FIG. 12, another step may comprise preventing the cutting insert from rotating with a plunger after the cutting insert is indexed.

In yet another embodiment of the method 100 of FIG. 12, an additional step may comprise the machine moving a tool holder of the tool away from the stationary fixture and a biasing member of the tool moving the cutting insert into a pocket of the tool holder to prevent the cutting insert from rotating.

In still another embodiment of the method 100 of FIG. 12, yet another step may comprise a biasing member of the stationary fixture biasing the moveable indexing pin relative to the stationary fixture.

In an additional embodiment of the method 100 of FIG. 12, the method 100 may further comprise any of the steps of operating the cutting system 10 of FIGS. 1-11 as described above.

In other embodiments, one or more steps of the method 100 of FIG. 12 may vary in substance and/or in order, one or more steps of the method 100 may not be followed, and/or one or more additional steps may be added to the method 100.

The cutting systems and methods described herein may utilize purely mechanical stationary fixtures to automatically index their cutting inserts. This may result in a reduction of manufacturing cost, a reduction in repair cost, and less down-time of the cutting system.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

The invention claimed is:

1. A cutting system comprising:

a tool comprising a cam;

a cutting insert operatively connected to the cam; and a stationary fixture spaced apart from the tool, the stationary fixture comprising a moveable indexing pin moveable relative to the stationary fixture;

wherein the cam is configured to be moved into contact with the moveable indexing pin of the stationary fixture;

wherein the cam includes at least one slot formed therein, the slot having a longitudinal axis disposed at a non-parallel angle relative to an axis of rotation of the cam; and wherein relative movement between the tool and the stationary fixture causes the indexing pin to enter the slot and travel along the slot to impart rotational movement to the cam about the axis of rotation.

2. The cutting system of claim 1 wherein the cam comprises spaced-apart slots disposed around an outer surface of the cam, each of the spaced-apart slots extending along a respective longitudinal axis which is disposed at a respective non-parallel angle relative to the axis of rotation of the cam.

3. The cutting system of 2 wherein the cam comprises a circumferential slot extending around the outer surface of the cam, the spaced-apart slots intersecting the circumferential slot.

4. The cutting system of claim 1 wherein the tool further comprises a plunger, the plunger moveable relative to the cam and configured to prevent the cam from rotating after the cutting insert is indexed.

5. The cutting system of claim 1 wherein the stationary fixture further comprises a stationary pin.

6. The cutting system of claim 1 wherein the stationary fixture comprises a biasing member biasing the moveable indexing pin relative to the stationary fixture.

7. The cutting system of claim 1 wherein the moveable indexing pin of the stationary fixture is only configured to move vertically away from and towards the stationary fixture.

8. The cutting system of claim 1 wherein the tool comprises a tool holder comprising a pocket, the cutting insert disposed within and against the pocket with an interference fit preventing the cutting insert from rotating relative to the pocket, the pocket configured to move away from the cutting insert allowing the cutting insert to rotate.

9. The cutting system of claim 8 wherein the tool comprises a biasing member biasing the cutting insert towards the pocket.

10. The cutting system of claim 1 wherein the cutting insert is configured to be axially displaced relative to a pocket of the tool prior to said rotational movement, such that the cutting insert is at least partially disengaged from the pocket during rotation of the cam.

11. A cutting system comprising:

a machine tool;

a processor;

a tool comprising a cam;

a cutting insert operatively connected to the cam; and a stationary fixture spaced apart from the tool, the stationary fixture comprising a stationary pin and a moveable indexing pin moveable relative to the stationary fixture;

wherein the processor is configured to move the machine tool to move the cam into contact with the stationary pin and the moveable indexing pin of the stationary fixture;

wherein the cam includes at least one slot formed therein, the slot having a longitudinal axis disposed at a non-parallel angle relative to an axis of rotation of the cam; and wherein relative movement between the tool and the stationary fixture causes the indexing pin to enter the slot and travel along the slot to impart rotational movement to the cam about the axis of rotation.

12. The cutting system of claim 11 wherein the cam comprises spaced-apart slots disposed around an outer surface of the cam, each of the spaced-apart slots extending along a respective longitudinal axis which is disposed at a respective non-parallel angle relative to the axis of rotation of the cam.

13. The cutting system of 12 wherein the cam comprises a circumferential slot extending around the outer surface of the cam, the spaced-apart slots intersecting the circumferential slot.

14. The cutting system of claim 11 wherein the tool further comprises a plunger, the plunger moveable relative to the cam and configured to prevent the cam from rotating after the cutting insert is indexed.

15. The cutting system of claim 11 wherein the stationary fixture comprises a biasing member biasing the moveable indexing pin relative to the stationary fixture.

16. The cutting system of claim 11 wherein the tool comprises a tool holder comprising a pocket, the cutting insert disposed within and against the pocket with an interference fit preventing the cutting insert from rotating relative to the pocket, the cutting insert configured to move away from the pocket allowing the cutting insert to rotate.

17. The cutting system of claim 11 wherein the tool comprises a biasing member biasing the cutting insert towards the pocket.

18. A method of indexing a cutting insert of a tool comprising:

moving the tool to dispose a cam of the tool into contact with a moveable indexing pin of a stationary fixture;

disposing the moveable indexing pin within at least one slot formed in the cam, the slot having a longitudinal axis disposed at a non-parallel angle relative to an axis of rotation of the cam;

moving the tool relative to the stationary fixture to cause the moveable indexing pin to travel along the slot; and imparting rotational movement to the cam about the axis of rotation by the travel of the moveable indexing pin along the slot, thereby causing the cutting insert of the tool to index.

19. The method of claim 18 further comprising preventing rotation of the cutting insert within a pocket of a tool holder of the tool.

20. The method of claim 19 further comprising moving the pocket of the tool holder away from the cutting insert to allow the cutting insert to rotate.

21. The method of claim 20 wherein the moving the pocket of the tool holder away from the cutting insert comprises moving the tool holder relative to the cam of the tool while the cam of the tool is restrained against a stationary pin of the stationary fixture causing the pocket of the tool holder to be moved away from the cutting insert.

22. The method of claim 18 further comprising:

axially displacing the cutting insert relative to a pocket of the tool prior to moving the tool relative to the stationary fixture to cause the moveable indexing pin to travel along the slot; and repositioning the cutting insert into the pocket of the tool after imparting rotational movement to the cam to prevent further rotation of the cutting insert.

23. The method of claim 18 further comprising preventing the cutting insert from rotating with a plunger after the cutting insert is indexed.

24. The method of claim 18 further comprising moving a tool holder of the tool away from the stationary fixture and a biasing member of the tool moving the cutting insert into a pocket of the tool holder to prevent the cutting insert from rotating.

25. The method of claim 18 further comprising a biasing member of the stationary fixture biasing the moveable indexing pin relative to the stationary fixture.

* * * * *